United States Patent
Cosentino et al.

(12)

(10) Patent No.: US 6,684,077 B1
(45) Date of Patent: Jan. 27, 2004

(54) METHOD OF SELECTING A CALLING NUMBER FOR A MOBILE STATION FROM MULTIPLE CALLING NUMBERS

(75) Inventors: Phyllis Cosentino, Bartlett, IL (US); Bijan Farhang, Naperville, IL (US); Pradeep Sharma, Aurora, IL (US); Kenneth Shelhamer, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/409,684

(22) Filed: Sep. 30, 1999

(51) Int. Cl.[7] .................................................. H04Q 7/20
(52) U.S. Cl. ...................................... 455/456; 455/419
(58) Field of Search ................................ 455/432, 435, 455/456, 462, 463, 461, 422, 419, 528, 551, 552

(56) References Cited

U.S. PATENT DOCUMENTS

| | | | | |
|---|---|---|---|---|
| 4,742,560 A | * | 5/1988 | Arai ............................. | 455/551 |
| 5,448,622 A | * | 9/1995 | Huttunen ..................... | 455/551 |
| 5,734,980 A | * | 3/1998 | Hooper et al. ............... | 455/434 |
| 5,761,618 A | * | 6/1998 | Lynch et al. ................. | 455/419 |
| 5,784,693 A | | 7/1998 | Barber et al. | |
| 5,983,095 A | * | 11/1999 | Cameron ..................... | 455/414 |
| 6,195,558 B1 | * | 2/2001 | Griffith et al. .............. | 455/456 |

FOREIGN PATENT DOCUMENTS

| | | |
|---|---|---|
| EP | 0435052 A | 7/1991 |
| EP | 0526981 A | 2/1993 |

* cited by examiner

Primary Examiner—Dwayne Bost
Assistant Examiner—Shelia Smith

(57) ABSTRACT

In the method, the receipt or lack thereof of a number select code from a mobile station forms the basis for selecting a calling number from multiple calling numbers associated with the mobile station. The number select code may directly or indirectly identify a calling number.

12 Claims, 2 Drawing Sheets

METHOD OF SELECTING A CALLING NUMBER FOR A MOBILE STATION FROM MULTIPLE CALLING NUMBERS

BACKGROUND OF THE INVENTION

1. Field of the Invention

The present invention relates to the field of wireless communication, and more particularly, to a method of selecting a calling number for a mobile station from multiple calling numbers associated with the mobile station.

2. Description of Related Art

Typically, a mobile station has a single calling number associated therewith. Billing and operation features for the mobile station are generally associated with the mobile station based on the calling number. Examples of operation features are call waiting, call forwarding, voice mail, caller identification, etc.

Because mobile stations have a single calling number associated therewith, users of mobile stations (e.g., mobile phones) often require multiple mobile stations. For instance, a single user may have a first mobile phone for business purposes, and a second mobile phone for personal use. The user requires two mobile phones because the user wants different billing programs and operation features depending on whether a mobile phone is being used for business or personal purposes. Because only one calling number is associated with a mobile station, only one set of billing programs and one set of operation features are associated with the mobile station.

Accordingly, proposals for associating multiple calling numbers with a single mobile station have been made. In these proposals, the multiple calling numbers are stored at a mobile switching center and associated with a mobile station based on a unique identifier for the mobile station (e.g., the mobile identification number or MIN). However, these proposals have failed to provide a simple method for selecting which of the multiple calling numbers should be used for a call originating at the mobile station.

SUMMARY OF THE INVENTION

The present invention is directed to a method of selecting a calling number for a mobile station from multiple calling numbers associated with the mobile station.

In one embodiment, the calling numbers associated with a mobile station each correspond to a different zone of operation for the mobile station, and each calling number has a different number select code associated therewith. When a call origination request is received, it is determined whether a number select code has been received. If so, the calling number associated with the number select code is used to process the call origination request. If a number select code is not received, the location of the mobile station is determined, and the calling number corresponding to the zone including the mobile station is used to process the call origination request.

In another embodiment, each calling number has a different number select code associated therewith, and one of the calling numbers associated with the mobile station is set as a default calling number. When a number select code is received, the calling number associated with the number select code is used to process the call origination request. If a number select code is not received, the default calling number is used to process the call origination request.

In a further embodiment, the user of a mobile station directly or indirectly chooses one of the calling numbers associated with the mobile station. This choice is transmitted from the mobile station to a mobile switching center via a base station, and used to subsequently process a call origination request.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
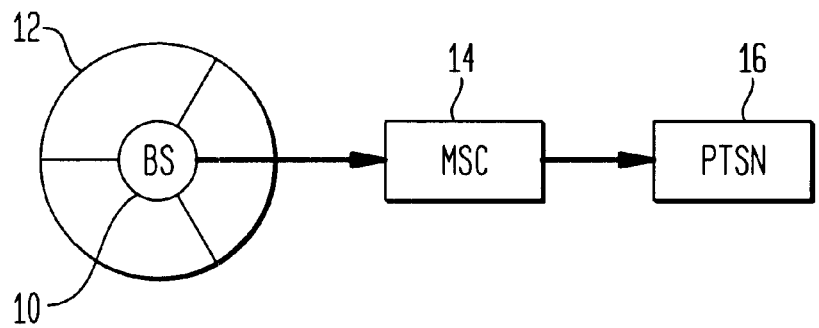
FIG. 1 illustrates a portion of a wireless communication system.

FIG. 1 illustrates a portion of a wireless communication system. As shown, a base station 10 serves the communication needs of mobile stations, such as mobile station 8, in a cell 12 divided into three sectors. For the sake of clarity, the directional antennas associated both with each sector of the cell 12 and the base station 10 have not been shown. The base station 10 is connected to a mobile switching center (MSC) 14. The MSC 14 acts as an interface between several base stations (not shown), including the base station 10, and a public telephone switching network (PTSN) 16. Namely, the MSC 14 routes calls from the PTSN 16 to the appropriate base station, routes calls between base stations for mobile station to mobile station communication, and routes calls from a base station to the PTSN 16.

Because the operation of the base station 10, the MSC 14 and the PTSN 16 are well-known, only those operational differences necessary to implement the present invention will be described for the sake of brevity. Unlike conventional wireless communication systems, for some mobile station subscribers, the MSC 14 associates more than one calling number with a single mobile station of the subscriber. In a preferred embodiment, the MSC 14 stores an unique identifier of the mobile station, such as the mobile identification number or MIN, and associates the multiple calling numbers for the mobile station with the unique identifier.

Next, embodiments of the method for selecting a calling number from multiple calling numbers associated with a mobile station when the mobile station originates a call will be described with respect to FIGS. 2–4.

Figure 2:
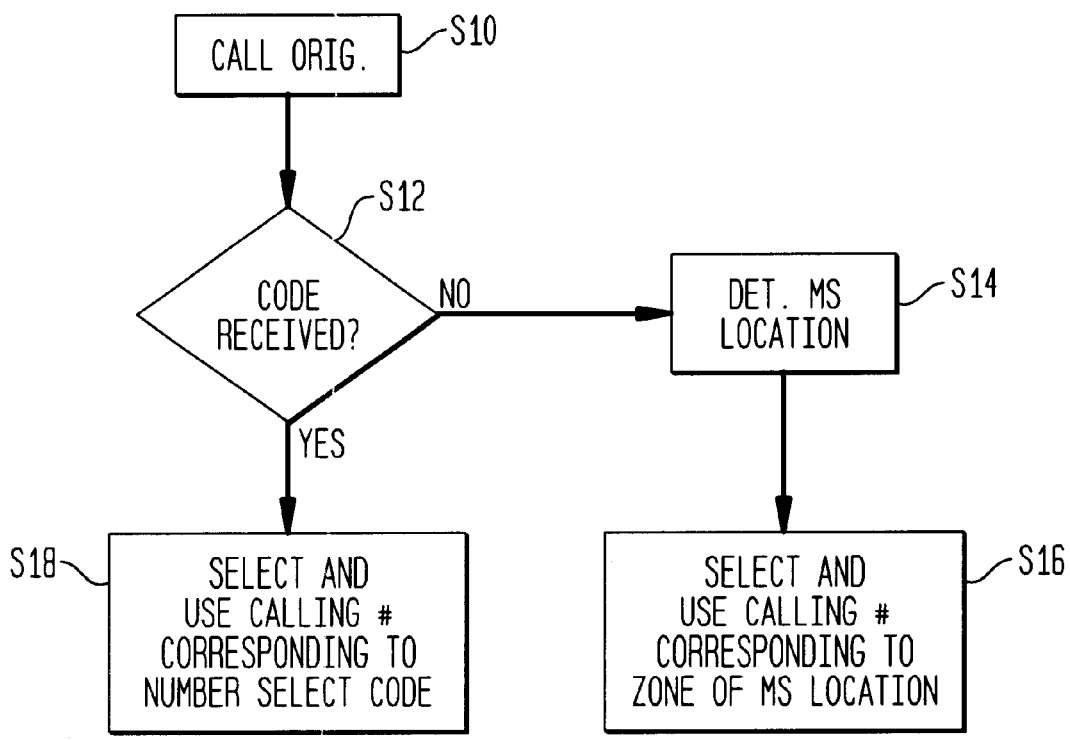
FIG. 2 illustrates a method of selecting a calling number for a mobile station from multiple calling numbers associated with the mobile station according to one embodiment of the present invention.

FIG. 2 illustrates a method of selecting a calling number for a mobile station from multiple calling numbers associated with the mobile station according to one embodiment of the present invention. In this embodiment, the service area for the mobile subscriber (e.g., the entire world, United States, East Coast, etc.) is divided into a number of zones of operation. Each calling number for the mobile station 8 is associated with a different one of the zones. The minimum size of a zone is limited by the method of determining the location of the mobile station 8 discussed in detail below.

It will be appreciated that numerous schemes exist for designing zones of operation and associating calling numbers with particular zones of operation. For the purposes of providing an example only, assume that the service area has been divided into two zones of operation, a personal zone and a business zone. Accordingly, a first and second calling number would be associated with the mobile station. The first calling number is for personal use and the second calling number is for business. The billing programs and operation features desired by the subscriber when using the mobile station 8 for personal purposes are assigned to the first calling number, and the billing programs and operation features desired by the subscriber when using the mobile station 8 for business purposes are assigned to the second calling number.

Furthermore, assume that the accuracy of locating a mobile station is limited to a sector, and the sector including the residence of the mobile subscriber is predetermined as a first zone. The first calling number, for personal use, and therefore the billing programs and operation features of this calling number are assigned to the first zone. The second zone is established as everywhere but the first zone, and the second calling number with associated billing programs and operation features are assigned to the second zone.

This scheme assumes that the subscriber generally uses the mobile station for personal purposes only when in or around his residence. However, the assumption could be just the opposite; namely, the subscriber generally uses his mobile station for business purposes only when in or around his business. Under this assumption, the second zone would be established as the sector covering the subscriber's business, and the first zone would be established as everywhere but the second zone.

As one skilled in the art will appreciate, the present invention is not limited to either of these schemes, the basis for these schemes (i.e., business and personal), the zones sizes, etc.

Furthermore, in this embodiment, each calling number has a different number select code associated therewith. For example, when the mobile station is a mobile phone, the number select code for each calling number could be "*##", where each "#" individually represents a number between 0 and 9.

As shown in FIG. 2, in step S10, the MSC 14 receives a call origination request from the mobile station 8 via the base station 10. The call origination request includes the unique identifier of the mobile station 8 and the number being called by the mobile station 8. The number being called by the mobile station 8 could also include a number select code for one of the calling numbers associated with the mobile station 8 as a prefix. Using the unique identifier of the mobile station 8, the MSC 14 accesses the calling numbers for the mobile station 8.

Then, in step S12, the MSC 14 determines if a number select code was received as part of the call origination request. If not, then in step S14, the MSC 14 determines the location of the mobile station. Numerous methods exist for determining the location of a mobile station, and the method used determines the precision of the location measurement.

For instance, for the mobile station 8 in cell 12, the MSC 14 knows the mobile station 8 is in or around cell 12 because the mobile station 8 is in communication with the base station 10. Furthermore, depending on which set of directional antennas are receiving signals from the mobile station 8, the base station 10 knows the sector in which the mobile station 8 is in or around, and the base station 10 can communicate this information to the MSC 14 (hereinafter, this location determining method will be referred to as the "sector location method").

If a more specific location measurement is desired, the MSC 14 uses known triangulation methods to determine the precise location of the mobile station 8. Alternatively, if the mobile station 8 is equipped with a global position sensor (GPS), the precise location of the mobile station 8 is determined based on the position information generated by the GPS and sent to the base station 10 by the mobile station 8.

As one skilled in the art will appreciate, the method of locating the mobile station determines the minimum size of a zone.

Returning to FIG. 2, after determining the location of the mobile station 8 in step S14, the MSC 14 selects the calling number corresponding to the zone in which the mobile station 8 is located, and uses the selected calling number to process the call origination request.

If, in step S12, a number select code is received in the call origination request, the MSC 14, in step S18, selects the calling number associated with the received number select code, and uses the selected calling number to process the call origination request.

Figure 3:
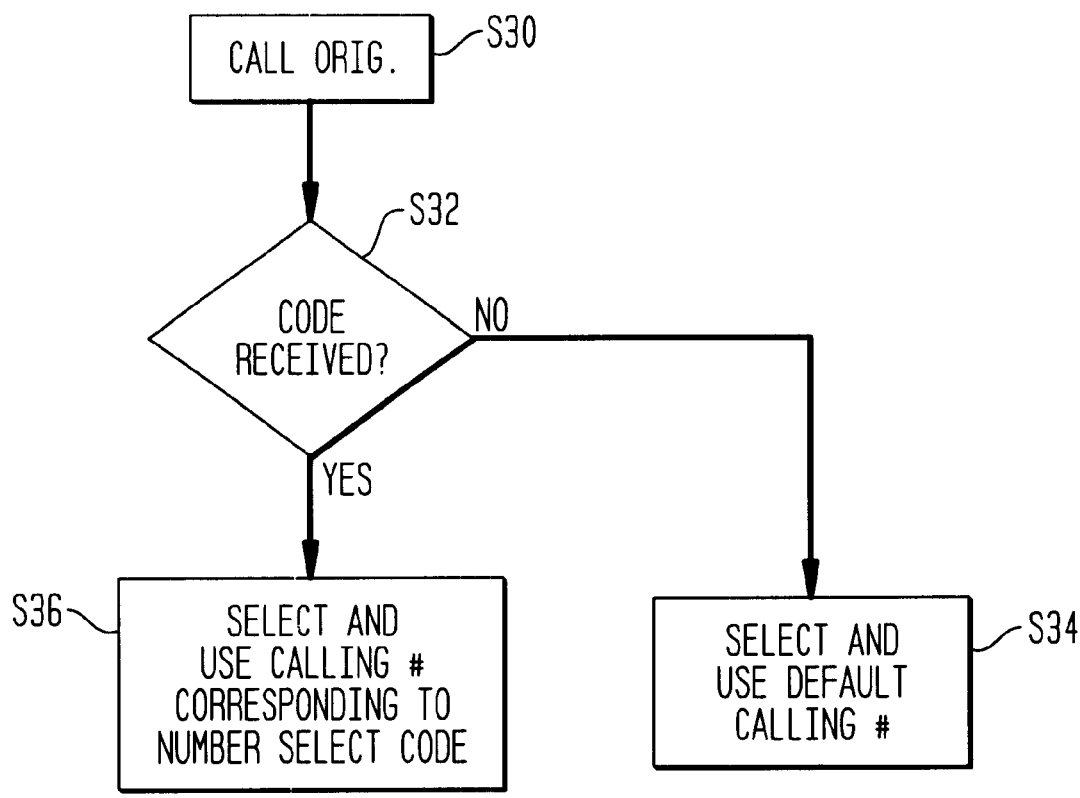
FIG. 3 illustrates a method of selecting a calling number for a mobile station from multiple calling numbers associated with the mobile station according to a further embodiment of the present invention.

FIG. 3 illustrates a method of selecting a calling number for a mobile station from multiple calling numbers associated with the mobile station according to another embodiment of the present invention. In this embodiment, a different number select code is associated with each calling number, and one of the calling numbers is predetermined as a default.

As shown in FIG. 3, in step S30, the MSC 14 receives a call origination request from the mobile station 8 via the base station 10. The call origination request includes the unique identifier of the mobile station 8 and the number being called by the mobile station 8. The number being called by the mobile station 8 could also include a number select code for one of the calling numbers associated with the mobile station 8 as a prefix. Using the unique identifier of the mobile station 8, the MSC 14 accesses the calling numbers for the mobile station 8.

Then, in step S32, the MSC 14 determines if a number select code was received as part of the call origination request. If not, then in step S34, the MSC 14 selects the default calling number, and uses the selected calling number to process the call origination request. If, in step S32, a number select code is received in the call origination request, the MSC 14, in step S34, selects the calling number associated with the received number select code, and uses the selected calling number to process the call origination request.

The methods described above with respect to FIGS. 2–3 provide the advantage that existing mobile stations do not need to be redesigned or reprogrammed to implement the present invention. Instead, only the service provider needs to perform modifications. FIG. 4, however, illustrates another embodiment of the present invention that provides greater flexibility in the selection of calling numbers, but requires modifications to existing mobile stations to implement the invention. Namely, the mobile station includes a mechanism by which the user of the mobile station can select a calling number for use during call origination.

In a preferred embodiment, the mobile station 8 includes a program that provides the user with a menu of the calling numbers. Through key entry, the user selects one of the calling numbers for use during call origination in step S50. The mobile station 8 then transmits the unique identifier and a code designating the selected calling number to the MSC 14 via the base station 10 in step S52. The MSC 14 will then process a subsequent call origination requests from the mobile station 8 using the calling number designated by the received code.

Instead of directly identifying a calling number, the user could indirectly choose the calling number based on a desired use of the mobile station. For instance, the menu could provide the user with choices such as personal, business, etc. Choosing a particular use indirectly sets the calling number. Instead of being use based, the indirect calling number choice may have another basis, such as location, (e.g., identifies a zone of operation).

Figure 4:
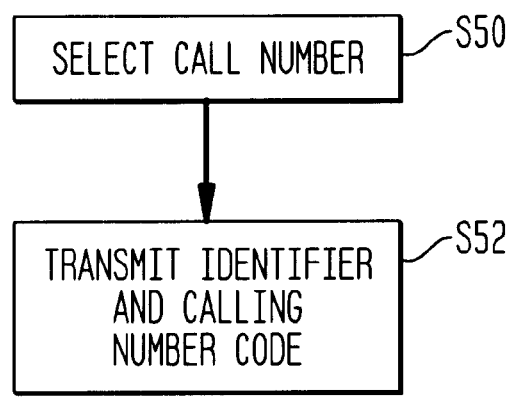
FIG. 4 illustrates a method of selecting a calling number for a mobile station from multiple calling numbers associated with the mobile station according to a still further embodiment of the present invention.

The method of FIG. 4 gives the mobile station user great flexibility in choosing a calling number, and eliminates the need for the user to remember number select codes and their correspondence to calling numbers of the mobile station 8.

The invention being thus described, it will be obvious that the same may be varied in many ways. Such variations are not to be regarded as a departure from the spirit and scope of the invention, and all such modifications are intended to be included within the scope of the following claims.

What is claimed:

1. A method of selecting a calling number for a mobile station from multiple calling numbers, comprising:

receiving a communication from the mobile station at a wireless communication system;

determining, at the wireless communication system, in which zone the mobile station is located, a service area of the network being divided into at least two zones of operation, the mobile station having at least two calling numbers associated therewith and each zone having one of the calling numbers corresponding thereto; and establishing a calling number for the mobile station as the calling number corresponding to the determined zone.

2. The method of claim 1, wherein each calling number has a predetermined set of features associated therewith.

3. The method of claim 1, wherein the zones include a home zone, and the home zone includes a residence of a subscriber using the mobile station.

4. The method of claim 1, wherein the zones include a business zone, the business zone being a location where a subscriber of the mobile station conducts business.

5. The method of claim 1, wherein the determining step determines in which zone the mobile station is located by determining with which sector of a wireless communication system the mobile station is in communication.

6. The method of claim 1, wherein the determining step determines in which zone the mobile station is located based on output from a global position sensor in the mobile station.

7. The method of claim 1, wherein each calling number has a predetermined set of features associated therewith.

8. A method of selecting a calling number for a mobile station from multiple calling numbers, comprising:

determining if a number select code has been received, at least two calling numbers being associated with the mobile station and each calling number having a different number select code associated therewith;

first establishing a calling number associated with the mobile station and the received number select code as the calling number for the mobile station if the determining step determines that a number select code has been received; and second establishing a default calling number as the calling number of the mobile station if the determining step determines that a number select code has not been received.

9. The method of claim 8, wherein the second establishing step establishes a predetermined default calling number as the calling number of the mobile station if the determining step determines that a number select code has not been received.

10. The method of claim 8, wherein the second establishing step comprises:

determining in which zone the mobile station is located, each zone having a calling number corresponding thereto; and third establishing a calling number for the mobile station as the calling number corresponding to the determined zone.

11. A method of selecting a calling number for a mobile station from multiple calling numbers, comprising:

first determining if a number select code has been received from the mobile station, at least two calling numbers being associated with the mobile station and each calling number having a different number select code associated therewith;

first establishing a calling number associated with the mobile station and the received number select code as the calling number for the mobile station if the determining step determines that a number select code has been received;

second determining in which zone the mobile station is located if the first determining step determines that a number select code has not been received, each zone having one of the calling numbers corresponding thereto; and second establishing a calling number for the mobile station as the calling number corresponding to the determined zone.

12. A method of selecting a calling number for a mobile station from multiple calling numbers, comprising:

first determining if a number select code has been received from the mobile station, at least two calling numbers being associated with the mobile station and each calling number associated with a different use of the mobile station, the number select code identifying a use of the mobile station; and first establishing a calling number associated with the mobile station and the identified use as the calling number if the first determining step determines that a number select code has been received;

second determining in which zone the mobile station is located if the first determining step determines that a number select code has not been received, each zone having one of the calling numbers corresponding thereto; and second establishing a calling number for the mobile station as the calling number corresponding to the determined zone.

* * * * *